(12) United States Patent
Nakao et al.

(10) Patent No.: US 8,127,501 B2
(45) Date of Patent: Mar. 6, 2012

(54) VEHICLE DOOR HAVING A GARNISH

(75) Inventors: Makoto Nakao, Chiryu (JP); Koji Yoshida, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 12/449,724

(22) PCT Filed: Apr. 15, 2008

(86) PCT No.: PCT/JP2008/057353
§ 371 (c)(1),
(2), (4) Date: Aug. 24, 2009

(87) PCT Pub. No.: WO2008/133115
PCT Pub. Date: Nov. 6, 2008

(65) Prior Publication Data
US 2010/0115851 A1 May 13, 2010

(30) Foreign Application Priority Data

Apr. 17, 2007 (JP) .................................. 2007-107839

(51) Int. Cl.
*B60J 5/04* (2006.01)

(52) U.S. Cl. .................... 49/502; 296/193.06; 296/1.08

(58) Field of Classification Search .................. 296/39.1, 296/193.06, 1.08; 49/502
See application file for complete search history.

(56) References Cited

U.S. PATENT DOCUMENTS

| 5,702,148 | A  | * | 12/1997 | Vaughan et al. | ........... 296/146.9 |
| 6,485,049 | B1 | * | 11/2002 | Prottengeier et al. | ...... 280/730.2 |
| 6,811,194 | B1 | * | 11/2004 | Gaertner et al. | ............. 296/1.08 |
| 6,889,472 | B2 | * | 5/2005  | Nozaki et al. | ................ 49/498.1 |
| 7,210,730 | B2 | * | 5/2007  | Fujita et al. | ................ 296/146.5 |
| 2005/0229514 | A1 | * | 10/2005 | Nakao et al. | ................. 52/288.1 |
| 2008/0282617 | A1 | * | 11/2008 | Zimmer et al. | ............. 49/495.1 |

FOREIGN PATENT DOCUMENTS

| JP | 60-72750 | 5/1985 |
| JP | 2-26927 | 2/1990 |
| JP | 3-28052 | 3/1991 |
| JP | 3-100514 | 10/1991 |
| JP | 3-107326 | 11/1991 |

(Continued)

OTHER PUBLICATIONS

International Search Report.

(Continued)

*Primary Examiner* — Gregory J. Strimbu
(74) *Attorney, Agent, or Firm* — Finnegan, Henderson, Farabow, Garrett & Dunner, LLP

(57) ABSTRACT

A garnish has an upper mounting projection concealed by a corner pad and a lower mounting projection concealed by a lower end of a vertical sash portion. The upper mounting projection is mounted in an upper mounting hole of the vertical sash portion. The lower mounting projection is mounted in a lower mounting hole of an outer panel. The upper mounting hole is concealed by the corner pad, and the lower mounting hole is concealed by the lower end of the vertical sash portion. This ensures a high quality appearance of the garnish without employing additional materials or components. Also, the garnish is mounted in a front door without reducing the surface area of the corresponding window of the vehicle.

6 Claims, 6 Drawing Sheets

FOREIGN PATENT DOCUMENTS

| | | |
|---|---|---|
| JP | 7-34209 | 6/1995 |
| JP | 9-24740 | 1/1997 |
| JP | 11-291762 | 10/1999 |
| JP | 2004-338522 | 12/2004 |
| JP | 2009-023630 | 2/2009 |
| WO | WO 2009/119318 | 10/2009 |
| WO | WO 2010/095734 | 8/2010 |

OTHER PUBLICATIONS

International Search Report dated Nov. 9, 2010.
International Search Report dated Jun. 1, 2010.
Japanese Office Action for JP Appl. No. 2007-107839 dated Jan. 17, 2012.

* cited by examiner

Outside of Vehicle

Outside of Vehicle

Outside of Vehicle

Outside of Vehicle

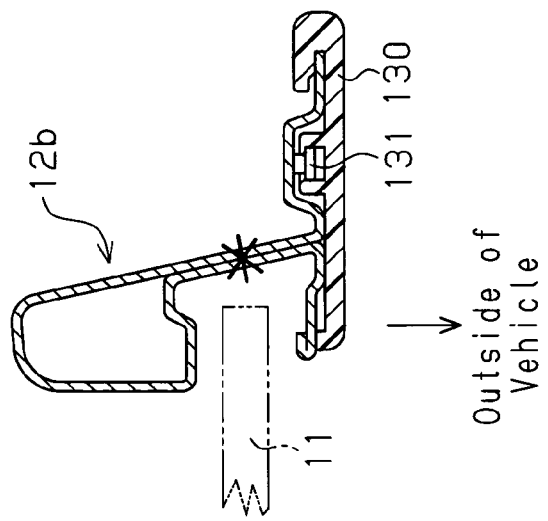
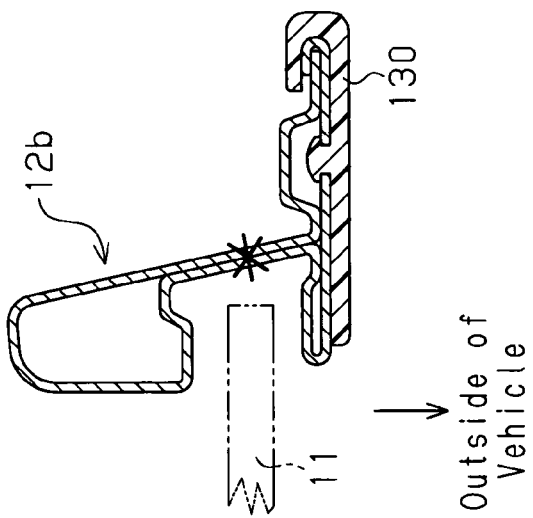
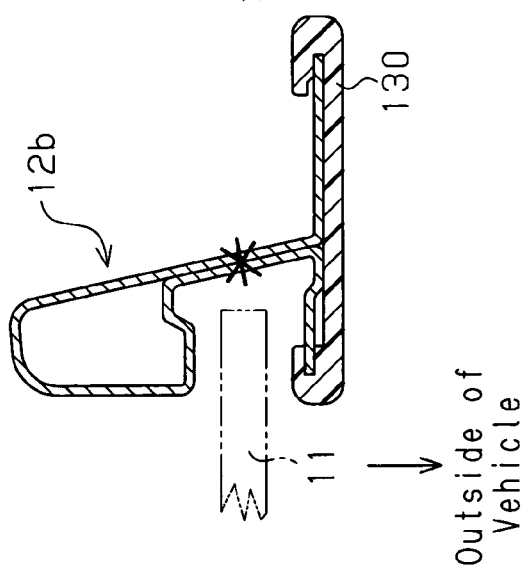

US 8,127,501 B2

VEHICLE DOOR HAVING A GARNISH

CROSS-REFERENCE TO RELATED APPLICATIONS

This application is a national phase application of International Application No. PCT/JP2008/057353, filed Apr. 15, 2008, and claims the priority of Japanese Application No. 2007-107839, filed Apr. 17, 2007, the contents of both of which are incorporated herein by reference.

FIELD OF THE INVENTION

The present invention relates to a vehicle door having a garnish.

BACKGROUND OF THE INVENTION

Japanese Laid-Open Patent Publication No. 2004-338522 discloses a vehicle door having a black garnish. The garnish covers a vertical sash arranged between a front door glass and a rear door glass of the vehicle. The front door glass, the rear door glass, and the black garnish bring about an integral appearance of the vehicle, which is continuous from the front of the vehicle to the rear.

As a structure for improving the appearance of the vehicle without employing a garnish, a vertical sash may be painted black or a black tape may be applied to the vertical sash. However, high skills are necessary to finish a painted surface of the vertical sash or apply the black tape accurately at a predetermined position. In contrast, the garnish is attached to the vehicle inexpensively without requiring such high skills.

FIGS. 9(a), 9(b), and 9(c) show three types of garnish mounting structures disclosed in Japanese Laid-Open Patent Publication No. 2004-338522. In these garnish mounting structures, a garnish 130 is mounted on an outer surface of a vertical sash portion 12b. The garnish 130 illustrated in FIG. 9(a) is engaged with the vertical sash portion 12b in such a manner as to wrap around the front and rear edges of the vertical sash portion 12b. The garnish 130 shown in FIG. 9(b) has an engagement projection inserted in a mounting hole formed in the vertical sash portion 12b. The garnish 130 illustrated in FIG. 9(c) has engagement portions engaged with a pair of stud members 131, which are welded to the vertical sash portion 12b. The stud members 131 are 5 spaced apart in the vertical direction.

However, since the garnish 130 of FIG. 9(a) wraps around the edges of the vertical sash portion 12b from outside, the dimension of the garnish 130 in the front-and-rear direction of the vehicle is greater than the corresponding dimension of the vertical sash portion 12b. This structure reduces the surface area of the corresponding window of the vehicle. In other words, the design of the appearance of the vehicle is restricted disadvantageously. The vertical sash portion 12b of FIG. 9(b) is formed by bending a plate material in a layered manner. In the drawing, the sign x represents the welded portion. Specifically, a mounting hole is formed in one of the layered portions of the plate material. The other layered portion of the plate material covers the hole so that the hole is invisible from the occupants of the vehicle. However, since the vertical sash portion 12b of FIG. 9(b) includes a great amount of plate material, the vertical sash portion 12b is heavy. In the vertical sash portion 12b shown in FIG. 9(c), the stud members 131 are expensive to add and difficult to ensure position accuracies when the stud members 131 are welded to the vertical sash portion 12b. Accordingly, the mounting positions of the garnish 130 on the vertical sash portion 12b tend to be offset, which may lower the appearance quality of the vehicle.

SUMMARY OF INVENTION

Accordingly, it is an objective of the present invention to provide a configuration of a vehicle door that ensures a high quality appearance without reducing the surface area of a window due to mounting of a garnish and without employing additional materials or components.

In accordance with one aspect of the present invention, a vehicle door to which a corner pad is attached is provided. The vehicle door includes an inner panel and an outer panel arranged outward relative to the inner panel with respect to a left-and-right direction of the vehicle. The outer panel is attached to the inner panel. A vertical sash portion has a lower end joined to the inner panel. The vertical sash portion has a guide side portion and a support side portion. The support side portion is located outward relative to the guide side portion with respect to the left-and-right direction of the vehicle. The guide side portion extends in the left-and-right direction of the vehicle. The support side portion extends in a front-and-rear direction of the vehicle. The support side portion has an outer surface facing outward and an inner surface facing inward with respect to the left-and-right direction of the vehicle. A garnish covers the outer surface of the support side portion. The support side portion includes a first receiving portion covered by the corner pad. The outer panel has a second receiving portion arranged between the support side portion and the garnish with respect to the left-and-right direction of the vehicle. The garnish includes an upper engagement portion extending through the first receiving portion and a lower inserting portion extending through the second receiving portion.

BRIEF DESCRIPTION OF THE DRAWINGS

FIGS. 9(a), 9(b), and 9(c) are cross-sectional views showing garnish mounting structures of the background art.

DETAILED DESCRIPTION OF THE PREFERRED EMBODIMENTS

FIGS. 1 to 8 show an embodiment of the present invention.

Figure 1:
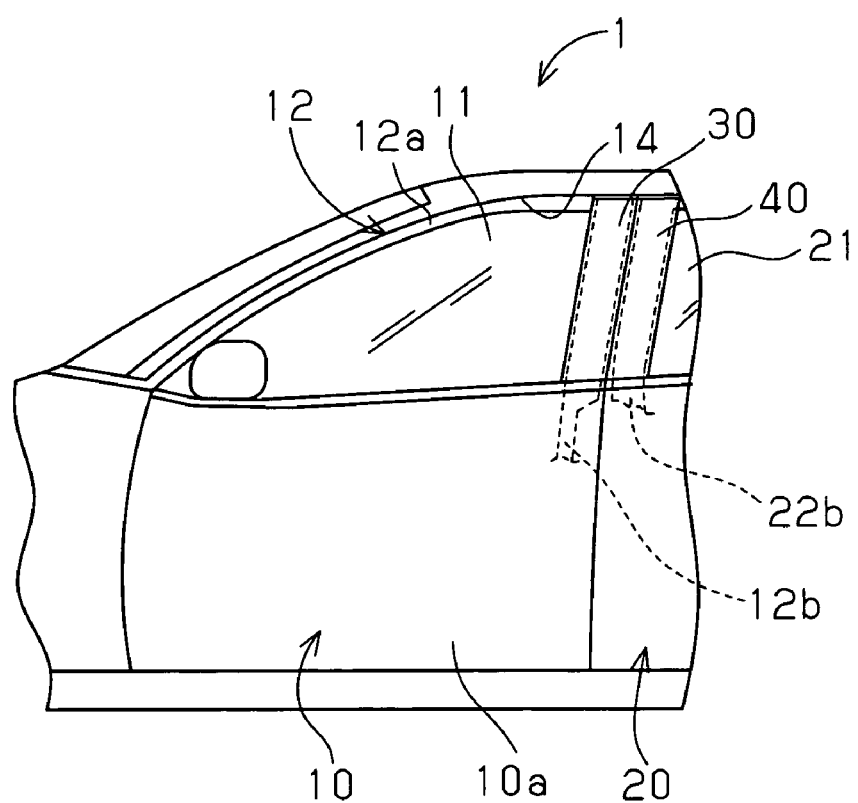
FIG. 1 is a side view showing a vehicle having a vehicle door according to one embodiment of the present invention.

FIG. 1 is a side view showing a portion of a vehicle 1 in the vicinity of a front door 10. The vehicle 1 has a door opening 14, a front door 10 and a rear door 20, which selectively open and close the door opening 14. The front door 10 represents a vehicle door of the illustrated embodiment. Although the following description is focused on the configuration of the front door 10, the invention may be used for the rear door 20 in the same manner as the case of the front door 10.

As illustrated in FIG. 1, the front door 10 has a door body 10a, a front door glass 11, and a sash 12. The door body 10a forms a lower half portion of the front door 10. The front door glass 11 is selectively raised and lowered with respect to the door body 10a. The sash 12 guides and supports the front door glass 11 in such a manner as to allow the front door glass 11 to be selectively raised and lowered with respect to the door body 10a. The sash 12 is attached to and supported by the door body 10a.

Figure 6:
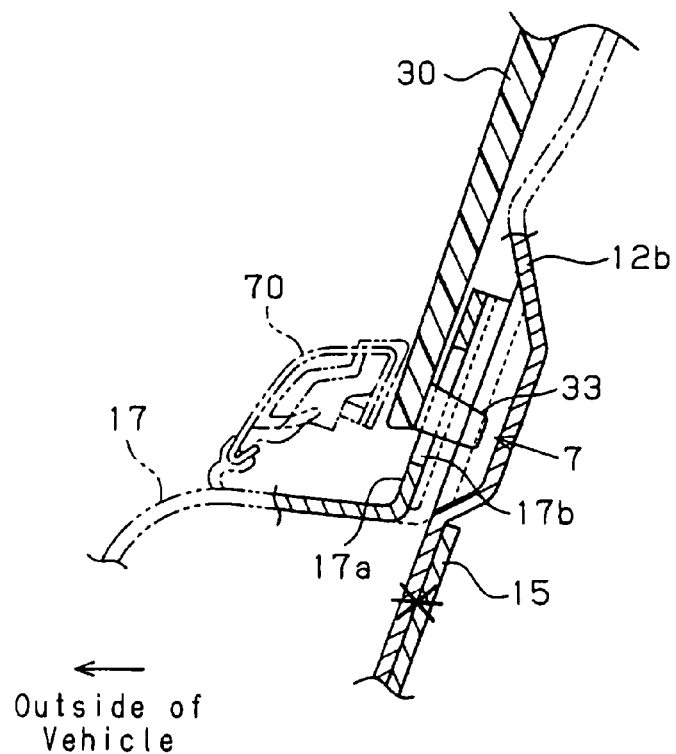
FIG. 6 is a cross-sectional view taken along line 6-6 of FIG. 2.
Figure 8:
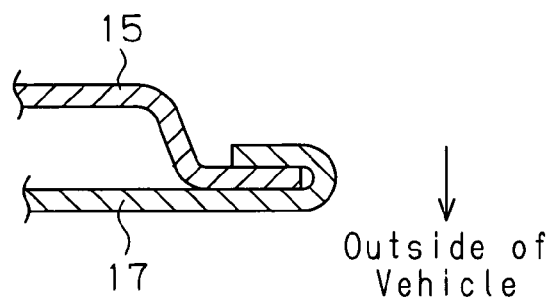
FIG. 8 is a cross-sectional view taken along line 8-8 of FIG. 2.

As shown in FIG. 6, the door body 10a has a double panel structure including an inner panel 15 and an outer panel 17. With reference to FIG. 8, an edge of the outer panel 17 is bent in such a manner as to wrap around an edge of the inner panel 15. This joins the inner panel 15 to the outer panel 17. The outer panel 17 is located outward from the inner panel 15 with respect to the left-and-right direction, which is the width direction of the vehicle.

The sash 12 has an upper sash portion 12a and a vertical sash portion 12b. The upper sash portion 12a extends along the door opening 14 in the front-and-rear direction of the vehicle at a position above the front door glass 11. The vertical sash portion 12b extends in the vertical direction of the vehicle. The rear end of the upper sash portion 12a is welded to and joined to the upper end of the vertical sash portion 12b.

The front end of the upper sash portion 12a and the lower end of the vertical sash portion 12b are attached to and supported by the door body 10a. As illustrated in FIG. 6, the lower end of the vertical sash portion 12b is welded to the inner panel 15.

Similarly, the rear door 20 has a rear door glass 21 and a vertical sash portion 22b.

With reference to FIG. 1, the front door 10 further includes a garnish 30, which covers an outer surface of the vertical sash portion 12b. In other words, the garnish 30 covers the outer surface of the vertical sash portion 12b facing outward with respect to the left-and-right direction of the vehicle. The rear door 20 also includes a garnish 40, which covers the outer surface of the vertical sash portion 22b. The garnishes 30, 40 are black molded resin products. The front door glass 11, the rear door glass 21, and the black garnishes 30, 40 bring about an integral appearance of the vehicle, which is continuous from the front of the vehicle to the rear.

Figure 2:
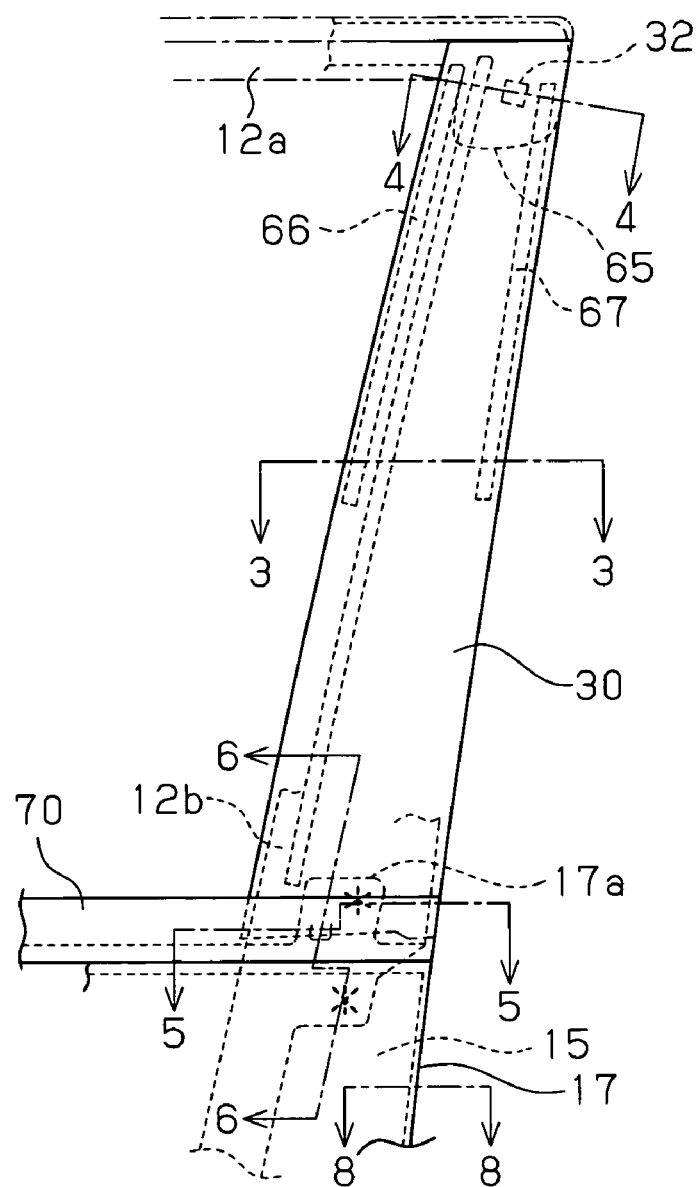
FIG. 2 is an enlarged view showing a portion of the vehicle door illustrated in FIG. 1.
Figure 3:
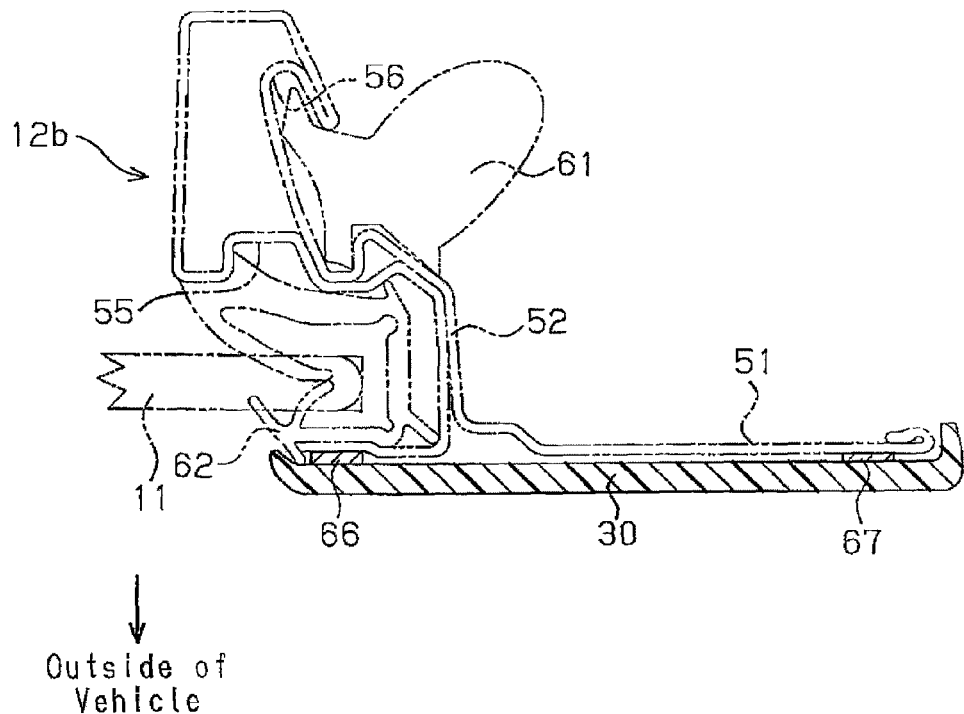
FIG. 3 is a cross-sectional view taken along line 3-3 of FIG. 2.
Figure 4:
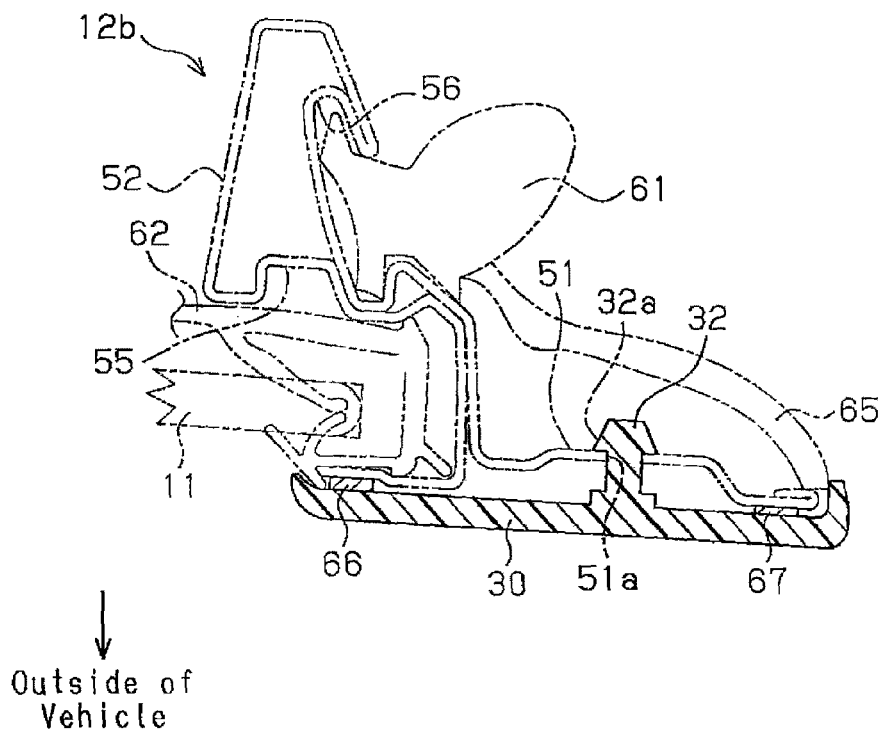
FIG. 4 is a cross-sectional view taken along line 4-4 of FIG. 2.
Figure 5:
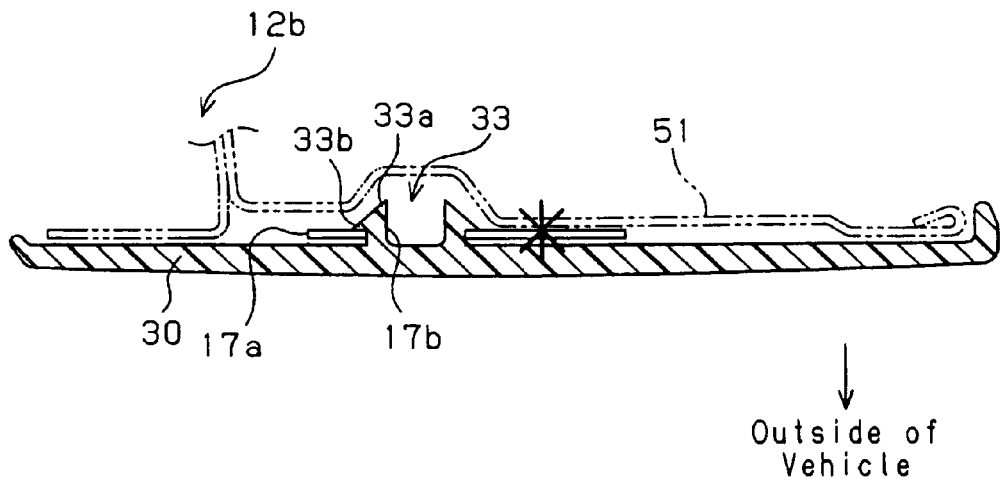
FIG. 5 is a cross-sectional view taken along line 5-5 of FIG. 2.

FIG. 2 is an enlarged view showing the garnish 30. The garnish 30 is shaped as an elongated flat plate extending in the vertical direction. The garnish 30 has a substantially rectangular shape. FIGS. 3 to 6 and 8 are cross-sectional views showing corresponding portions of FIG. 2. FIGS. 3 to 5 are horizontal cross-sectional views and FIG. 6 is a vertical cross-sectional view. FIGS. 3 to 6 each illustrate the position of the garnish 30 indicated by the solid lines relative to the position of the vertical sash portion 12b indicated by the double dotted chain lines.

FIG. 3 shows a substantially central portion of the vertical sash portion 12b in the longitudinal direction. The elongated vertical sash portion 12b, which extends in the vertical direction, is formed through roll forming. Specifically, the vertical sash portion 12b is formed substantially in a reversed T shape by bending a single plate member for multiple times. The lateral side of the T shape forms a support side portion 51 and the vertical side of the T shape forms a guide side portion 52. The support side portion 51 extends in the front-and-rear direction of the vehicle. The support side portion 51 is a non-layered portion of the plate material forming the vertical sash portion 12b and formed by the front end and the rear end of the plate material in the front-and-rear direction of the vehicle, which extend in such a manner as to be flush with each other. The guide side portion 52 is a double-layered portion of the plate material forming the vertical sash portion 12b. In other words, the guide side portion 52 is a layered surface portion in which the plate material is layered and the support side portion 51 is a single surface portion in which the plate material is not layered.

As shown in FIG. 3, the support side portion 51 supports the garnish 30. The support side portion 51 has an outer surface facing outward and an inner surface facing inward with respect to the left-and-right direction of the vehicle. The garnish 30 covers the outer surface of the support side portion 51. A guide groove 55 and a seal support groove 56 are formed in the guide side portion 52. The guide groove 55 has an opening facing forward in the vehicle and supports the front door glass 11. The guide groove 55 receives a glass runner 62, which is an elastic body. The glass runner 62 guides the rear end of the front door glass 11.

The seal support groove 56 has an opening facing the rear of the vehicle and supports a seal member 61. The seal member 61 seals the gap between the vertical sash portion 12b and the door body 10a. The guide groove 55 is located between the support side portion 51 and the seal support groove 56.

As illustrated in FIG. 4, the upper end of the vertical sash portion 12b has an upper mounting hole 51a, and the garnish 30 has an upper mounting projection 32 serving as an upper engagement portion. By engaging the upper mounting projection 32 with the upper mounting hole 51a, the upper end of the garnish 30 is attached to the vertical sash portion 12b. In the present embodiment, the upper mounting projection 32 is formed integrally with the garnish 30.

As illustrated in FIG. 2, the upper mounting hole 51a is arranged in the portion of the support side portion 51 in the vicinity of a welded joint portion between the upper sash portion 12a and the support side portion 51. With reference to FIG. 4, the upper mounting hole 51a is located substantially at the center of the support side portion 51 in the front-and-rear direction of the vehicle. The upper mounting projection 32 is located at the position of the inner surface of the garnish 30 that is opposed to the support side portion 51. A large-diameter barb portion 32a is formed at the distal end of the upper mounting projection 32. The barb portion 32a stops the upper mounting projection 32 from separating from the upper mounting hole 51a when the upper mounting projection 32 is received in the upper mounting hole 51a.

The size of the clearance between the upper mounting projection 32 and the peripheral surface of the upper mounting hole 51a when the upper mounting projection 32 is passed through the upper mounting hole 51a is set to a minimum value. In other words, the clearance between the upper mounting projection 32 and the peripheral surface of the upper mounting hole 51a is set to such a size that movement of the garnish 30 attached to the vertical sash portion 12b is restricted in the vertical direction and the front-and-rear direction of the vehicle with respect to the vertical sash portion 12b.

As shown in FIG. 4, a waterproof corner pad 65 extends from the rear end of the vertical sash portion 12b to the seal member 61.

The corner pad 65 covers the upper mounting hole 51a and the upper mounting projection 32. As a result, even when the front door 10 is open, the upper mounting hole 51a and the upper mounting projection 32 are invisible from the occupants of the vehicle 1. In other words, the support side portion 51 has a first receiving portion covered by the corner pad 65.

The upper mounting hole 51a is located in the first receiving portion. The upper mounting projection 32 extends through the first receiving portion.

As the corner pad 65, a commonly-available product used in a normal door structure can be employed. In other words, by concealing the upper mounting hole 51a and the upper mounting projection 32 using the conventional corner pad 65, desirable appearance of the front door 10 is maintained without employing an additional component. Further, the upper mounting projection 32 is prevented from being contacting hands of occupants. Specifically, the corner pad 65 covers the inner surface of the support side portion 51 in the vicinity of the portion of the vertical sash portion 12b that is welded to and joined to the upper sash portion 12a.

As illustrated in FIGS. 2 to 4, a double-faced adhesive tape 66 is applied between the garnish 30 and the front end of the support side portion 51. A double-faced adhesive tape 67 is applied between the garnish 30 and the rear end of the support side portion 51. The double-faced adhesive tapes 66, 67 each extend in the vertical direction and assist in improving the bonding strength of the garnish 30 with respect to the vertical sash portion 12b.

With reference to FIGS. 5 and 6, a lower mounting projection 33 serving as a lower inserting portion is formed at the lower end of the garnish 30. A lower mounting hole 17b is formed in the outer panel 17. By inserting the lower mounting projection 33 through the lower mounting hole 17b, the lower end of the garnish 30 is attached to the door body 10a. As illustrated in FIG. 5, the lower mounting projection 33 includes a pair of claws 33a, which are spaced apart in the front-and-rear direction of the vehicle. Each of the claws 33a has a barb portion 33b, which prevents the claw 33a from separating from the lower mounting hole 17b.

With reference to FIG. 6, the outer panel 17 has a flange portion 17a extending upward from the upper side of the door body 10a. The flange portion 17a is formed in a portion of the upper side of the door body 10a. The lower mounting hole 17b is located in the flange portion 17a. The lower mounting projection 33 extends through the flange portion 17a. That is, the flange portion 17a functions as a second receiving portion located between the support side portion 51 and the garnish 30 with respect to the left-and-right direction of the vehicle.

Figure 7:
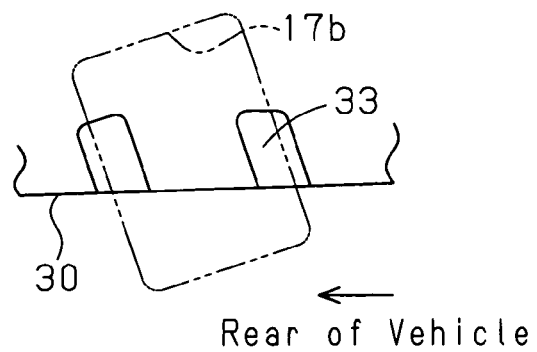
FIG. 7 is a diagram as viewed in the direction represented by arrow 7 of FIG. 6.

As illustrated in FIG. 7, the lower mounting hole 17b has a rectangular shape. The garnish 30 is attached to the door body 10a in a state inclined with respect to the vertical direction. The elongated side of the lower mounting hole 17b extends in a manner inclined substantially in the same direction as the garnish 30. In other words, with reference to FIG. 2, the vertical sash portion 12b is inclined in such a manner that the upper end of the vertical sash portion 12b is located rearward in the vehicle compared to the lower end of the vertical sash portion 12b. Similarly, the garnish 30 is inclined in such a manner that the upper end of the garnish 30 is located rearward in the vehicle compared to the lower end of the garnish 30. Further, the lower mounting hole 17b and the claws 33a are inclined in such a manner that the upper ends of the lower mounting hole 17b and the claws 33a are located rearward in the vehicle compared to the corresponding lower ends of the lower mounting hole 17b and the claws 33a.

When the lower mounting projection 33 is passed through the lower mounting hole 17b, movement of the lower mounting projection 33 in the front-and-rear direction of the vehicle is restricted but movement of the lower mounting projection 33 in the vertical direction is allowed with respect to the flange portion 17a of the outer panel 17. The peripheral end of the lower mounting hole 17b restricts the movement of the lower mounting projection 33 in the front-and-rear direction of the vehicle. When the upper mounting projection 32 is not mounted in the upper mounting hole 51a, the lower mounting projection 33 is movable along the lower mounting hole 17b in the vertical direction.

With reference to FIG. 6, the garnish 30 extends to cover the lower end of the vertical sash portion 12b at the upper side of the door body 10a. A belt molding 70 extending in the front-and-rear direction of the vehicle is attached to the upper side of the door body 10a. The belt molding 70 covers the lower end of the garnish 30 and makes the garnish 30 invisible from the exterior.

As illustrated in FIG. 5, the portion of the vertical sash portion 12b close to the lower mounting projection 33 is welded to the outer panel 17.

The illustrated embodiment has the following advantages.

(1) The garnish 30 has the upper mounting projection 32, which is concealed by the corner pad 65, and the lower mounting projection 33, which is concealed by the lower end of the vertical sash portion 12b. The upper mounting projection 32 is mounted in the upper mounting hole 51a of the vertical sash portion 12b. The lower mounting projection 33 is mounted in the lower mounting hole 17b of the outer panel 17. The upper mounting hole 51a is concealed by the corner pad 65 and the lower mounting hole 17b is concealed by the lower end of the vertical sash portion 12b. Accordingly, desirable appearance of the garnish 30 is ensured without employing additional materials or components.

The upper mounting projection 32 and the lower mounting projection 33 are received in the garnish 30 in the front-and-rear direction of the vehicle. The dimension of the garnish 30 in the front-and-rear direction of the vehicle is equal to the dimension of the vertical sash portion 12b in the front-and-rear direction of the vehicle. This makes it unnecessary to reduce the surface area of the corresponding window of the vehicle 1, causing less restriction to the design of the vehicle. The garnish 30 is engaged with the vertical sash portion 12b without wrapping around the opposite ends of the vertical sash portion 12b in the front-and-rear direction of the vehicle, unlike, for example, the case illustrated in FIG. 9(a).

(2) The vertical sash portion 12b is formed by bending the single plate material for multiple times. The vertical sash portion 12b has the support side portion 51, in which the plate material is not layered, and the guide side portion 52, in which the plate material is double-layered. This decreases the amount of the plate material forming the support side portion 51, thus reducing the weight of the vertical sash portion 12b.

(3) When the front door 10 is assembled, the sash 12, the inner panel 15, and the outer panel 17 are joined together. Engagement between the upper mounting projection 32 and the vertical sash portion 12b and engagement between the lower mounting projection 33 and the outer panel 17 causes engagement between the garnish 30 and the front door 10. In other words, the upper mounting projection 32 and the lower mounting projection 33 are engaged with different members. When the members of the front door 10 are assembled together, the interval between the upper mounting hole 51a and the lower mounting hole 17b easily vary. That is, assembly errors easily occur between the vertical sash portion 12b and the outer panel 17. However, the lower mounting projection 33 of the illustrated embodiment is permitted to move in the vertical direction with respect to the lower mounting hole 17b. The lower mounting projection 33 is thus reliably received in the lower mounting hole 17b.

(4) The lower mounting hole 17b is formed in the flange portion 17a of the outer panel 17. This configuration ensures high accuracy in the mounting position of the garnish 30 with respect to the outer panel 17. The line defined by the end of the garnish 30 extending in the vertical direction is easily positioned accurately with respect to the line defined by the end of the outer panel 17 extending in the vertical direction in such a manner that these lines extend in a manner overlapping as a single line in the vertical direction. This makes it easy to obtain desirable appearance of the vehicle.

(5) The lower mounting hole 17b has a rectangular shape. The longitudinal direction of the rectangular shape is inclined with respect to the vertical direction at the angle equal to the inclination angle of the garnish 30 with respect to the vertical direction. Accordingly, even if there is in the relative positions of the components of the front door 10 when the front door 10 is assembled, a desirable quality of appearance of the front door 10 is always ensured easily. In other words, the line defined by the end of the garnish 30 extending in the vertical direction is maintained in a desirable state easily and constantly, in such a manner that this line and the line defined by the end of the outer panel 17 extending in the vertical direction of the outer panel 17 overlap with each other as a single line in the vertical direction.

The illustrated embodiment may be modified to the following forms.

The lower mounting projection 33 serving as the lower inserting portion does not necessarily have to be the lower engagement portion engaged with the flange portion 17a of the outer panel 17. The barb portion 33b may be omitted from the lower mounting projection 33. That is, the lower mounting projection 33 may simply extend through the outer panel 17. In other words, the lower mounting projection 33 may be simply passed through the lower mounting hole 17b.

The upper mounting projection 32 does not necessarily have to be formed integrally with the garnish 30. For example, a conventional and typical clip may be attached to the garnish 30 as an independent component, and the clip may function as the upper mounting projection 32.

The invention claimed is:

1. A vehicle door to which a corner pad is attached, the vehicle door having a width direction and a length direction, the door further having an outer side and an inner side, the vehicle door comprising:
   an inner panel;
   an outer panel arranged outward relative to the inner panel with respect to the width direction of the door, the outer panel being attached to the inner panel;
   a vertical sash portion having a lower end joined to the inner panel, the vertical sash portion having a guide side portion and a support side portion, the support side portion being located closer to the outer side of the door than the guide side portion in the width direction of the door, the guide side portion extending in the width direction of the door, the support side portion extending in the length direction of the door, the support side portion having an outer surface facing away from the guide side portion and an inner surface facing toward the guide side portion; and
   a garnish covering the outer surface of the support side portion,
   wherein the support side portion includes a first receiving portion covered by the corner pad, the outer panel having a second receiving portion arranged between the support side portion and the garnish in the width direction of the door, the garnish including an upper engagement portion and a lower inserting portion, the upper engagement portion being a solid structure whose distal end has a barb which extends through the first receiving portion, the lower inserting portion formed by a pair of claws which are spaced apart from one another, each of the claws having a barb extending from the claw generally in the length direction of the door and extending through the second receiving portion.

2. The vehicle door according to claim 1, wherein the vertical sash portion is T shaped, with the guide side portion being a base of the T shape, and the support side portion being a top of the T shape.

3. The vehicle door according to claim 1, wherein the upper engagement portion is engaged with the vertical sash portion in such a manner as to restrict movement of the upper engagement portion relative to the vertical sash portion.

4. The vehicle door according to claim 1, wherein the outer panel has a flange portion that extends upward, the second receiving portion being located in the flange portion, the second receiving portion comprising a lower mounting hole through which the lower inserting portion is inserted.

5. The vehicle door according to claim 4, wherein the pair of claws is engaged with the flange portion to lock the garnish against movement relative to the flange portion in the length direction of the door but permit movement of the garnish relative to the flange portion in a generally vertical direction.

6. The vehicle door according to claim 4,
   wherein the garnish extends in a direction which is inclined with respect to a vertical direction of the door, and
   wherein the lower mounting hole has a rectangular shape and a longitudinal axis thereof extends in the direction the garnish extends.

* * * * *